(12) United States Patent
Arashi (10) Patent No.: US 10,036,879 B2
(45) Date of Patent: Jul. 31, 2018

(54) MICROSCOPE

(71) Applicant: OLYMPUS CORPORATION, Hachioji-shi, Tokyo (JP)

(72) Inventor: Bunryu Arashi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 66 days.

(21) Appl. No.: 15/226,285

(22) Filed: Aug. 2, 2016

(65) Prior Publication Data
US 2017/0045725 A1     Feb. 16, 2017

(30) Foreign Application Priority Data

Aug. 10, 2015 (JP) ................... 2015-158464

(51) Int. Cl.
*G02B 21/08* (2006.01)
*G02B 21/02* (2006.01)
*G02B 21/00* (2006.01)

(52) U.S. Cl.
CPC ....... *G02B 21/086* (2013.01); *G02B 21/0032* (2013.01); *G02B 21/02* (2013.01)

(58) Field of Classification Search
CPC .... G02B 21/086; G02B 21/088; G02B 21/02; G02B 21/08; G02B 21/082; G02B 21/025; G02B 21/0088; G02B 21/0032
See application file for complete search history.

(56) References Cited

U.S. PATENT DOCUMENTS

| 6,212,005 B1 * | 4/2001 | Kawasaki | G02B 21/06 359/368 |
| 2005/0168808 A1 * | 8/2005 | Ishiwata | G02B 21/14 359/368 |
| 2013/0335820 A1 | 12/2013 | Matsumoto et al. | |

FOREIGN PATENT DOCUMENTS

JP     2014002219 A    1/2014

* cited by examiner

*Primary Examiner* — Marin Pichler
(74) *Attorney, Agent, or Firm* — Holtz, Holtz & Volek PC

(57) ABSTRACT

A microscope includes a condenser lens that is arranged removably and insertably with respect to a light path of light from a light source, and an objective that collects the light from the light source, which has been transmitted through a sample. A conditional expression below is satisfied when b is an exit pupil diameter of the objective and $a_{det}$ is a diameter of an area in a state in which the condenser lens has been removed from the light path, the area being included in an exit pupil plane of the objective and being an area through which the light from the light source, which has entered the objective through one point on the sample, passes:

$$1/20 \leq a_{det}/b \leq 1/2 \qquad (1).$$

20 Claims, 7 Drawing Sheets

MICROSCOPE

CROSS REFERENCE TO RELATED APPLICATIONS

This application is based upon and claims the benefit of priority from prior Japanese Patent Application No. 2015-158464, filed on Aug. 10, 2015, the entire contents of which are incorporated herein by this reference.

BACKGROUND OF THE INVENTION

Field of the Invention

The present invention relates to a microscope and more specifically to a microscope in which a condenser lens is arranged removably and insertably with respect to a light path.

Description of the Related Art

A culture microscope is a microscope for observing a living cell that is cultured within a container such as a laboratory dish. When it is configured as an upright microscope, there occurs a problem in which, for example, an objective is dipped into a culture. Thus, the culture microscope is normally configured as an inverted microscope in which a sample is illuminated from above and is observed from below.

In the culture microscope, a sample is arranged on a stage, contained in a culture container, in order to prevent a cell from being contaminated, and there are culture containers of various sizes. Thus, a culture microscope has been proposed that holds a condenser lens removably and attachably, which makes it possible to arrange a container on a stage and observe a sample even though the container is tall. Such a microscope is disclosed in, for example, Japanese Laid-open Patent Publication No. 2014-002219.

SUMMARY OF THE INVENTION

An aspect of the present invention provides a microscope that includes a condenser lens that is arranged removably and insertably with respect to a light path of light from a light source and that radiates the light from the light source onto a sample, and an objective that collects the light from the light source, which has been transmitted through the sample, wherein a conditional expression below is satisfied when b is an exit pupil diameter of the objective and $a_{det}$ is a diameter of an area in a state in which the condenser lens has been removed from the light path, the area being included in an exit pupil plane of the objective and being an area through which the light from the light source, which has entered the objective through one point on the sample, passes.

$$1/20 \leq a_{det}/b \leq 1/2 \quad (1)$$

BRIEF DESCRIPTION OF THE DRAWINGS

The present invention will be more apparent from the following detailed description when the accompanying drawings are referenced.

FIGS. 1A to 1C are overview diagrams of a microscope 100, wherein

FIGS. 3A to 3C illustrate a pupil filling rate of an objective 11, wherein FIG. 3C illustrates the pupil filling rate in a state in which the condenser lens 2 is mounted and a portion of light from a light source is blocked by an aperture stop 7a;

FIGS. 5A and 5B illustrate beams of light from an LED light source 21 to the objective 11 in a microscope according to the first embodiment, wherein

FIGS. 6A and 6B illustrate beams of light from an LED light source 31 to a sample plane SP in a microscope according to a third embodiment, wherein FIGS. 7A and 7B illustrate beams of light from an LED light source 41 to the sample plane SP in a microscope according to a fifth embodiment, wherein

DESCRIPTION OF THE EMBODIMENTS

In order to provide an illumination optical system having a simple configuration in a relatively inexpensive culture microscope, a critical illumination optical system is often used.

In a microscope for which a critical illumination optical system is used, when a condenser lens that constitutes the critical illumination optical system is removed, light from a collector lens enters an objective directly, and a blurred image of a light source is formed at a pupil position of the objective. In this state, a pupil filling rate of the objective is generally increased. Further, in this state, there exists no position, in the illumination optical system, that is conjugate with the pupil position of the objective, so it is not possible to provide an aperture stop in the illumination optical system. Thus, it is also difficult to adjust the pupil filling rate of the objective by adjusting a numerical aperture of the illumination optical system.

When the pupil filling rate of an objective is too high, a contrast of an image is too low, so a transparent object, such as a cultured cell, that is less likely to cause a change in the intensity of a radiated light is not satisfactorily visualized. Thus, in the conventional relatively inexpensive culture microscope, when a transparent object is observed in a state in which a condenser lens has been removed, it is difficult to visualize the transparent object satisfactorily. This problem is particularly significant when observation at a low magnification is performed on, for example, an iPS cell that has attracted attention in recent years.

An embodiment of the present invention will now be described with reference to FIGS. 1A to 4. A "pupil of an objective" refers herein to an exit pupil of the objective unless otherwise specified. Further, a "pupil filling rate of the objective" refers to the proportion of a diameter of an area to a pupil diameter of the objective, the area being included in an exit pupil plane of the objective and being an area through which light from a light source, which has entered the objective through one point on a sample, passes (that is, diameter of the area/pupil diameter). Furthermore, in an illumination optical system, "front" refers to a side closer to the light source. In other words, a "front focal position of a condenser lens" refers to, of focal positions of the condenser lens, a position closer to the light source than to the condenser lens. A "front focal position of a collector lens" refers to, of focal positions of the collector lens, a position closer to the light source than to the collector lens.

Figure 1A:
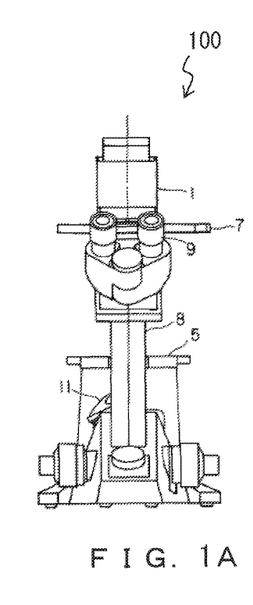
FIG. 1A is a front view.
Figure 1B:
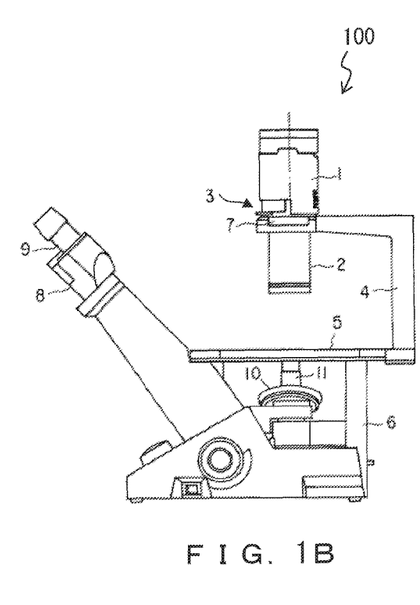
FIG. 1B is a side view in a state in which a condenser lens 2 is mounted.
Figure 1C:
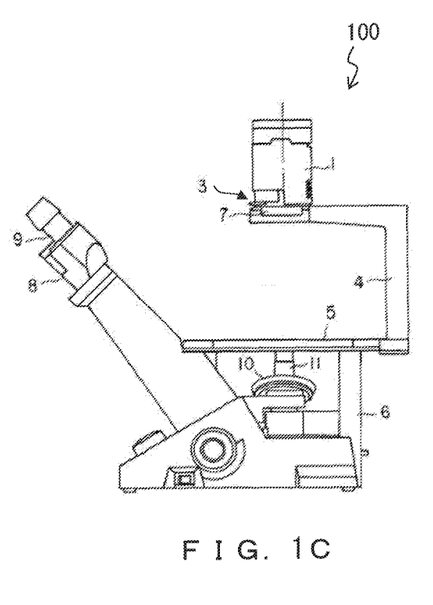
FIG. 1C is a side view in a state in which the condenser lens 2 has been removed.
Figure 2:
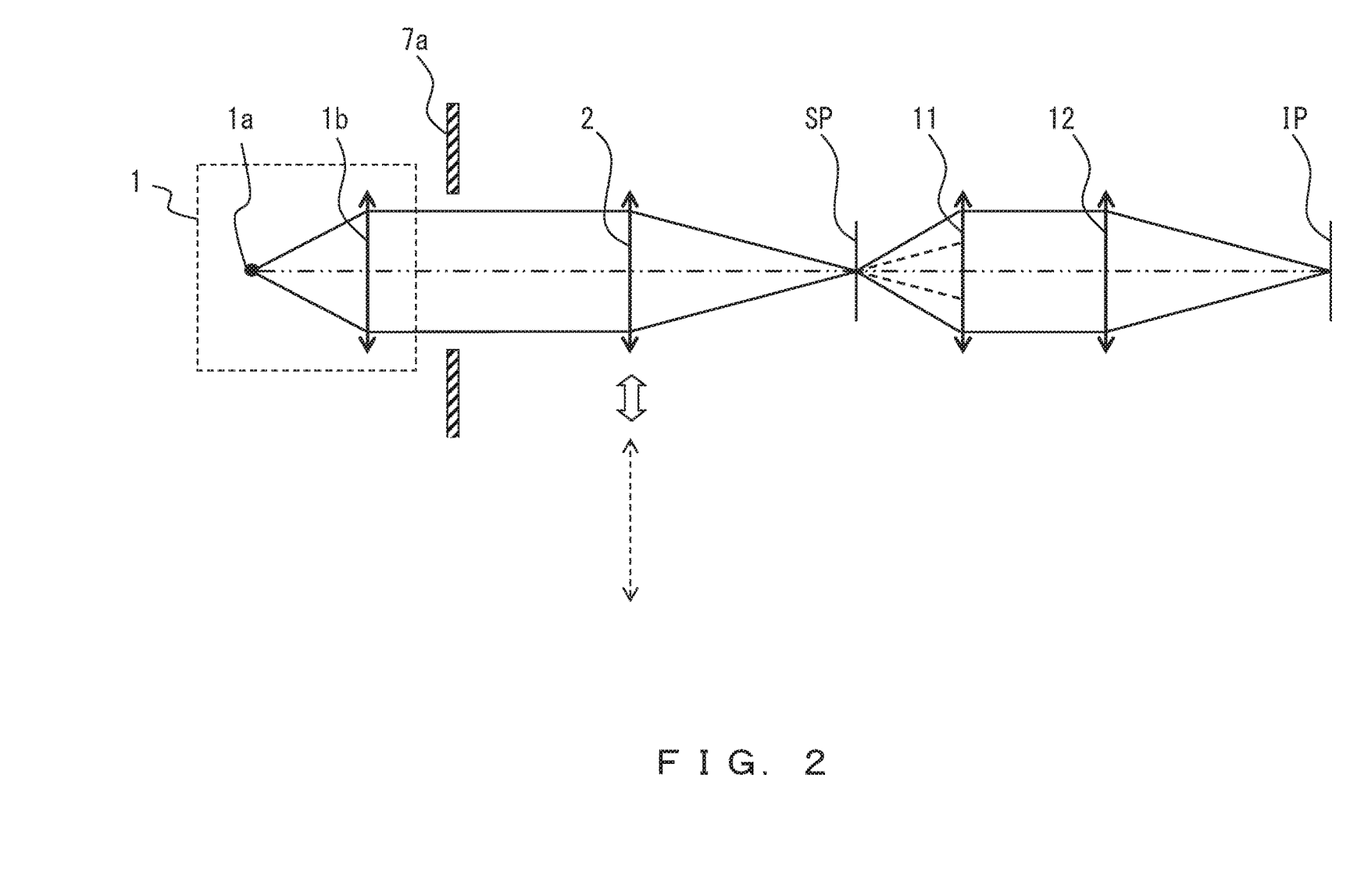
FIG. 2 is a diagram that illustrates a configuration of an optical system of the microscope 100.

FIGS. 1A to 1C are overview diagrams of a microscope 100 according to an embodiment of the present invention. FIG. 1A is a front view and FIGS. 1B and 1C are side views. FIG. 2 is a diagram that illustrates a configuration of an optical system of the microscope 100. The microscope 100 is an inverted microscope to observe, from below, a sample that is illuminated from above a stage 5, and is, for example, a culture microscope to observe, for example, a cultured cell.

As illustrated in FIG. 1B, the microscope 100 includes, above the stage 5, an illumination optical system mounted on an arm 4 that extends from the stage 5. The illumination optical system of the microscope 100 includes a light source unit 1 and a condenser lens 2. As illustrated in FIG. 2, the light source unit 1 has a light source 1a and a collector lens 1b internally. The light source 1a is a surface-emitting light source, and is, for example, an LED (light emitting diode) light source. The collector lens 1b converts light from the light source 1a into a substantially collimated beam and directs the substantially collimated beam toward the condenser lens 2. The condenser lens 2 radiates, onto a sample, the light from the light source la that is incident through the collector lens 1b. As illustrated in FIGS. 1B and 1C, the condenser lens 2 is configured to be removable and attachable with respect to the arm 4. In other words, the condenser lens 2 is arranged removably and insertably with respect to a light path of light from the light source 1a.

As illustrated in FIG. 2, in a state in which the condenser lens 2 is inserted into a light path, light emitted from the light source 1a is converted into a substantially collimated beam in the collector lens 1b and collected by the condenser lens 2 on a sample plane SP. In other words, the illumination optical system of the microscope 100 is a critical illumination optical system, and a light source image is formed on the sample plane SP and the sample plane SP is illuminated.

As illustrated in FIGS. 1A to 1C, the microscope 100 includes, between the light source unit 1 and the condenser lens 2, a slider 7 that slides in a direction perpendicular to an optical axis of the condenser lens 2. For example, various optical members such as an aperture stop 7a illustrated in FIG. 2 and a ring slit are arranged on the slider 7. When the slider 7 is slid, an arbitrary optical member on the slider 7 is inserted into a light path between the light source unit 1 and the condenser lens 2 and preferably into a front focal position of the condenser lens 2.

A dial 3 illustrated in FIGS. 1B and 1C is a dial for adjustment to change a state of an optical member arranged by the slider 7 in the light path. For example, when the dial 3 is turned in a state in which the aperture stop 7a is arranged in the light path, it is possible to change an aperture diameter of the aperture stop 7a (hereinafter simply referred to as a diameter) and to adjust a numerical aperture of the illumination optical system. When the aperture stop 7a is arranged at the front focal position of the condenser lens 2, an illumination field is not changed even though the aperture diameter is changed. Thus, the arrangement of the aperture stop 7a at the front focal position of the condenser lens 2 is preferable in that vignetting does not occur in the field of view. Further, the arrangement is also preferable in that the size of a light source image projected onto a sample plane is not changed when the light source 1a is defocused. The aperture stop 7a is not limited to a variable aperture stop having a variable diameter, but may be a fixed aperture stop in which an aperture having a specific diameter is formed. Further, the aperture stop 7a maybe arranged such that a center of an aperture is offset from the optical axis of the condenser lens 2, in order to perform an oblique illumination.

As illustrated in FIGS. 1A to 1C, the microscope 100 includes, below the stage 5 that is fixed on a base 6, a revolving nose-piece 10 and an objective 11 mounted on the revolving nose-piece 10. The microscope 100 further includes a tube 8 that extends from the front of the base 6, and an ocular lens 9 that is mounted on the tube 8. The objective 11 is, for example, an infinity-corrected objective, and collects light from the light source 1a, which has been transmitted through a sample. A plurality of objectives can be mounted on the revolving nose-piece 10. It is possible to switch the objective used for observation by revolving the revolving nose-piece 10. The tube 8 is a binocular tube, and is configured to divide, into two, light that is incident through the objective 11 and to guide the two lights to the ocular lens 9.

As illustrated in FIG. 2, the microscope 100 converts light that has passed through the sample plane SP into a collimated beam using the objective 11 and collects the collimated beam in an image plane IP using a tube lens 12. The ocular lens 9 magnifies a sample image (an intermediate image) formed in the image plane IP and projects it onto an eye of a user of the microscope 100. This permits the user of the microscope 100 to observe the sample image formed in the image plane IP through the ocular lens 9.

The microscope 100 having the configuration described above uses, as a light source, a surface-emitting light source such as an LED light source, and is designed such that the light source is positioned properly. This makes it possible to observe a transparent object well even in a state in which the condenser lens 2 has been removed from the light path in order to reserve a large space above the stage 5.

An angle of incidence of light that reaches the sample plane SP in a state in which the condenser lens 2 has been removed from the light path is dependent on the size of a light source. When the position of a light source is changed in a direction to move it away from the collector lens 1b, the same angle of incidence is realized using a smaller light source, and a larger angle of incidence is realized using a light source of the same size. In other words, a maximum angle of incidence can be controlled by the position of a light source. When a light source, such as a halogen lamp, that includes a light emitter having not less than a certain thickness in an optical-axis direction is used, light from a light source is emitted from a wide range in the optical-axis direction. This makes it difficult to control the maximum angle of incidence. On the other hand, when the position of a light source is arranged far away from a front focal position of the collector lens 1b, it is not possible to secure a numerical aperture and a working distance that meet the specifications of the condenser lens 2 in a state in which the condenser lens 2 is inserted into the light path. The reason is that light that enters the condenser lens 2 is a strongly-convergent light or a strongly-divergent light. Thus, in light of these points, the position of a light source is determined such that both the performance in a state in which the condenser lens 2 has been removed from the light path and the performance in a state in which the condenser lens 2 is inserted into the light path satisfy a required performance.

More specifically, the microscope 100 is configured to satisfy Conditional Expression (1) below so as to be able to satisfactorily visualize a transparent object such as a cultured cell even in a state in which the condenser lens 2 has been removed. Here, b is an exit pupil diameter of the objective 11. $a_{det}$ is a diameter of an area in a state in which the condenser lens 2 has been removed from the light path, the area being included in an exit pupil plane PP of the objective 11 and being an area through which light from the light source 1a, which has entered the objective 11 through one point on a sample, passes. The one point on a sample is, for example, a point on the sample plane SP and on the optical axis as illustrated in FIG. 2.

$$1/20 \leq a_{det}/b \leq 1/2 \quad (1)$$

Conditional Expression (1) specifies a pupil filling rate of the objective 11 in a state in which the condenser lens 2 has been removed from the light path. If the pupil filling rate is not greater than the upper limit of Conditional Expression (1), it is possible to enhance a contrast of an image sufficiently, which results in being able to satisfactorily visualize a sample so as to observe it even when the sample is a transparent object. In a conventional microscope, the pupil filling rate of an objective is greater than the upper limit of Conditional Expression (1) in a state in which a condenser lens has been removed and light from a collector lens is directly radiated onto a sample. Thus, the contrast of an image is low and a transparent object is not sufficiently visualized. On the other hand, the microscope 100 is designed in advance such that the pupil filling rate of the objective 11 in a state in which the condenser lens 2 has been removed satisfies Conditional Expression (1). Thus, it is possible to observe a transparent object even in a state in which the condenser lens 2 has been removed. It is not preferable that the pupil filling rate of the objective 11 be less than the lower limit of Conditional Expression (1) because the contrast is made stronger but a resolving power is made too low.

In order to obtain a bright sample image in a state in which the condenser lens 2 is mounted, the microscope 100 is preferably configured to satisfy Conditional Expression (2) below. Here, $a_{att}$ is a diameter of an area in a state in which the condenser lens 2 is inserted into the light path, the area being included in the exit pupil plane PP of the objective 11 and being an area through which light from the light source 1a, which has entered the objective 11 through the one point on a sample, passes.

$$1/3 \leq a_{att}/b \leq 1 \quad (2)$$

Conditional Expression (2) specifies the pupil filling rate of the objective 11 in a state in which the condenser lens 2 is inserted into the light path. If the pupil filling rate is not less than the lower limit of Conditional Expression (2), it is possible to obtain a high contrast and a sufficient resolving power when a bright field observation is performed on, for example, a stained sample. In this case, $a_{att}$ is not made larger beyond b.

In order to satisfactorily visualize a transparent object such as a cultured cell even in a state in which the condenser lens 2 is mounted, as is the case in a state in which the condenser lens 2 has been removed, the microscope 100 is preferably configured to satisfy Conditional Expression (3) below. Here, $a_{stop}$ is a diameter of an area in a state in which the condenser lens 2 and the aperture stop 7a are inserted into the light path, the area being included in the exit pupil plane PP of the objective 11 and being an area through which light from the light source 1a that has entered the objective 11 through the one point on a sample passes.

$$1/20 \leq a_{stop}/b \leq 1/2 \quad (3)$$

Conditional Expression (3) specifies the pupil filling rate of the objective 11 in a state in which the condenser lens 2 and the aperture stop 7a are inserted into the light path. The range of the pupil filling rate that satisfies Conditional Expression (3) is the same as that of Conditional Expression (1). When the aperture stop 7a is a fixed aperture stop, Conditional Expression (3) can easily be satisfied just by sliding the slider 7 and inserting the aperture stop 7a into the light path. Further, when the aperture stop 7a is a variable aperture stop, Conditional Expression (3) may be satisfied by adjusting the diameter of the aperture stop 7a.

Figure 3A:
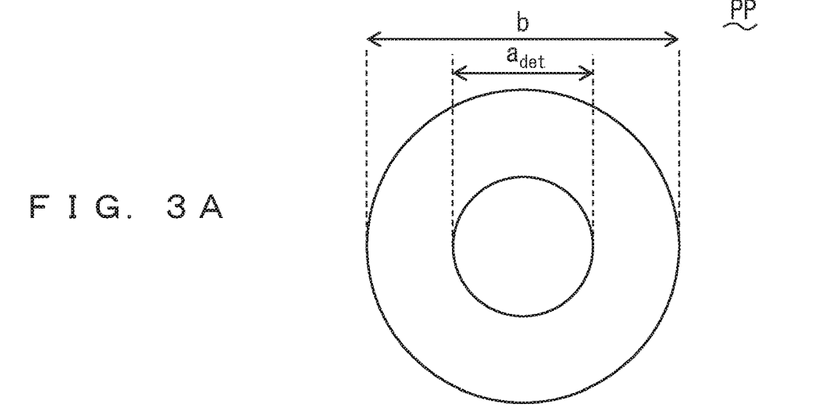
FIG. 3A illustrates the pupil filling rate in a state in which the condenser lens 2 has been removed.
Figure 3B:
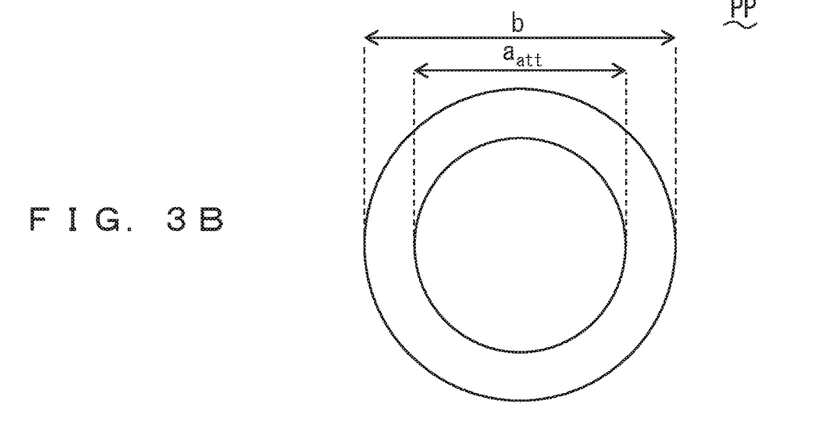
FIG. 3B illustrates the pupil filling rate in a state in which the condenser lens 2 is mounted.
Figure 3C:
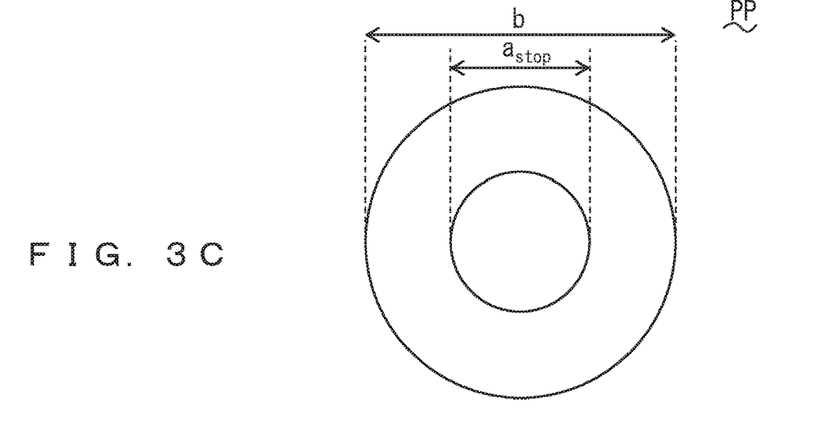

FIGS. 3A to 3C illustrate the pupil filling rate of the objective 11. FIG. 3A illustrates the pupil filling rate in a state in which the condenser lens 2 has been removed. FIG. 3B illustrates the pupil filling rate in a state in which the condenser lens 2 is mounted. FIG. 3C illustrates the pupil filling rate in a state in which the condenser lens 2 is mounted and a portion of light from a light source is blocked by the aperture stop 7a.

As illustrated in FIGS. 3A and 3B, the microscope 100 preferably has a higher pupil filling rate in a state in which the condenser lens 2 is mounted than in a state in which the condenser lens 2 has been removed. This results in being able to satisfactorily visualize a transparent object that is not visualized in a state in which the condenser lens 2 is mounted, so as to observe it. Further, as illustrated in FIGS. 3A and 3C, preferably, in a state in which the condenser lens 2 is mounted and, further, the aperture stop 7a is arranged in the light path, the microscope 100 has almost the same pupil filling rate as in a state in which the condenser lens 2 has been removed. This results in being able to satisfactorily visualize a transparent object so as to observe it without removing the condenser lens 2.

In order to ensure a sufficient pupil filling rate in a state in which the condenser lens 2 is mounted, the microscope 100 is preferably configured to satisfy Conditional Expression (4) below. Here, $F_b$ is a distance to the front focal position of the collector lens 1b from a first surface that is a closest surface of the collector lens 1b to the light source 1a. d is a distance from the first surface of the collector lens 1b to a light-emitting surface LP of the light source 1a.

$$0.9 \leq |d/F_b| \leq 1.1 \quad (4)$$

Conditional Expression (4) specifies a positional relationship between the front focal position of the collector lens 1b and the light-emitting surface LP. When $|d/F_b|=1$, light directed from the collector lens 1b to the sample plane SP becomes a collimated beam. When $|d/F_b|$ is greater than the upper limit or is less than the lower limit, light emitted from the light-emitting surface LP is strongly converged or diverged in the collector lens 1b. As a result, the numerical aperture of the illumination optical system in a state in which the condenser lens 2 is mounted is made smaller than a designed value. Thus, the pupil filling rate of the objective 11 is also decreased, and then Conditional Expression (2) is not satisfied. If Conditional Expression (4) is satisfied, a sufficient pupil filling rate is easily ensured. Accordingly, it is possible to obtain a bright sample image using a critical illumination when a bright field observation is performed on, for example, a stained sample. Even when the light source 1a is an LED light source and the LED light source is surrounded by a dome lens, Conditional Expression (4) is preferably satisfied, as in the other cases. Even when the LED light source is surrounded by a dome lens, the distance d is calculated using the light-emitting surface of the LED light source as the base.

In order to secure a sufficient illumination field, the microscope 100 is preferably configured to satisfy Conditional Expression (5) below. Here, $f_{COL}$ is a focal length of the collector lens 1b, and $f_{CD}$ is a focal length of the condenser lens 2.

$$2.5 \leq |f_{CD}/f_{COL}| \leq 7 \tag{5}$$

Conditional Expression (5) specifies a projection magnification to project the light source 1a onto the sample plane SP. If the light source 1a is projected onto the sample plane SP at a magnification of 2.5 to 7 times, it is possible to secure a sufficient illumination field for observation of a transparent object.

In order to keep the entire length within an acceptable range while ensuring a telecentricity, the microscope 100 is preferably configured to satisfy Conditional Expression (6) and Conditional Expression (7) below. Here, L is a distance from the light-emitting surface LP to the sample plane SP. $WD_{det}$ is a distance to the sample plane SP from a closest surface of the collector lens 1b to the sample plane SP. $WD_{att}$ is a distance, in a state in which the condenser lens 2 is inserted into the light path, from a closest surface of the condenser lens 2 to the sample plane SP to the sample plane SP.

$$1/8 \leq (f_{CD}+f_{COL})/L \leq 2/3 \tag{6}$$

$$1.5 \leq WD_{det}/WD_{att} \leq 4 \tag{7}$$

Conditional Expression (6) specifies the telecentricity of the illumination optical system. When $(f_{CD}+f_{COL})/L=1/2$, the illumination optical system is a perfect telecentric optical system. If Conditional Expression (6) is satisfied, it is possible to suppress a degradation of the telecentricity within an acceptable range. Further, if $(f_{CD}+F_{COL})/L$ is not less than the lower limit, it is also possible to prevent the entire length from becoming too long.

Conditional Expression (7) specifies a positional relationship between the collector lens 1b and the condenser lens 2. If Conditional Expression (7) is satisfied, it is possible to reserve a large space above the stage 5 when the condenser lens 2 is removed, while preventing the entire length from becoming too long.

Embodiments of the above-mentioned microscope 100 will now be described.

<First Embodiment>

Figure 4:
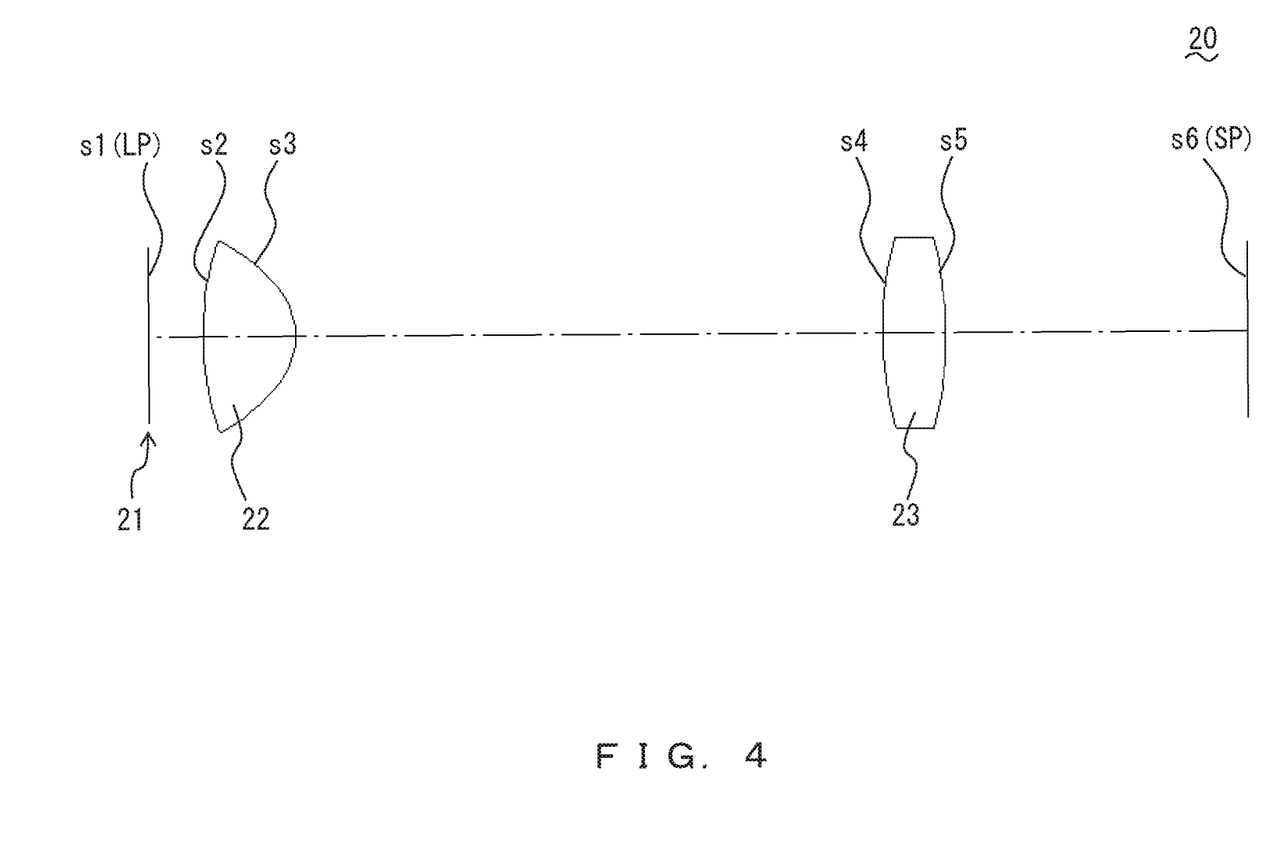
FIG. 4 is a sectional view of an illumination optical system 20 according to a first embodiment.

FIG. 4 is a sectional view of an illumination optical system 20 according to the present embodiment. A microscope according to the present embodiment is different from the microscope 100 in that it includes the illumination optical system 20 of FIG. 4. It is similar to the microscope 100 in regard to the other points. The illumination optical system 20 includes an LED light source 21, a collector lens 22, and a condenser lens 23. The LED light source 21 is a surface-emitting light source, and has, for example, a light-emitting surface LP with a φ (diameter) of 2 mm. The collector lens 22 is a single lens that has a positive power, and an aspherical lens that has an aspherical surface at a sample side. The condenser lens 23 is a single lens that has a positive power, and is a biconvex lens.

The following are pieces of data of the illumination optical system 20.

$F_b$=12.9951 mm, d=13 mm,
$f_{CD}$=79.0452 mm, $f_{COL}$=26.0025 mm, L=262 mm, $WD_{det}$=227 mm, $WD_{att}$=72 mm The objective 11 that is used in combination with the illumination optical system 20 is an ideal lens, and the following are its focal length f, numerical aperture NA, and pupil diameter b. The objective 11 is a 4× objective that is used in combination with a tube lens with a focal length of 180 mm.

f=45 mm, NA=0.16, b=14.4 mm

The following are parameters when the objective 11 is combined with the illumination optical system 20. $a_{stop}$ is calculated in a state in which the diameter of the aperture stop 7a provided in the surface of the collector lens 22 facing a sample side (surface number s3) is set to 5 mm.

$a_{det}$=3.5019 mm, $a_{att}$=14.4 mm, $a_{step}$=2.7936 mm

The following is lens data of the illumination optical system 20. INF in the lens data represents infinity (∞).

Illumination Optical System 20

| s | r | d | nd | vd |
|---|---|---|---|---|
| 1 | INF | 13.0000 | | |
| 2 | 68.2150 | 22.0000 | 1.52287 | 59.89 |
| 3* | −15.1000 | 140.0000 | | |
| 4 | 80.0000 | 15.0000 | 1.52287 | 59.89 |
| 5 | −80.0000 | 72.0000 | | |
| 6 | INF | | | |

Here, s represents a surface number, r represents a radius of curvature (mm), d represents a surface interval (mm), nd represents a refractive index with respect to a d line, and vd represents an Abbe number with respect to the d line. The surface represented by a surface number s1 is the light-emitting surface LP. The surface represented by a surface number s6 is the sample plane SP. A surface interval d1 represents a distance from the surface represented by the surface number s1 to the surface represented by a surface number s2.

The following is aspherical surface data of the collector lens 22. In this case, an aspherical surface shape is represented by the following formula. Here, Z is a coordinate of the aspherical surface in a direction of the optical axis. Y is a coordinate of the aspherical surface in a direction perpendicular to the optical axis. K is a conic constant. r is a paraxial radius of curvature of the aspherical surface. $A_2$, $A_4$, $A_6$, $A_8$, and $A_{10}$ are a second order aspheric coefficient, a fourth order aspheric coefficient, a sixth order aspheric coefficient, an eighth order aspheric coefficient, and a tenth order aspheric coefficient, respectively.

$$Z = \frac{Y^2}{r + r\sqrt{1-(K+1)\left(\frac{Y}{r}\right)^2}} + A_2Y^2 + A_4Y^4 + A_6Y^6 + A_8Y^8 + A_{10}Y^{10}$$

Third Surface s3
K=−1.0000, $A_2$=0, $A_4$=−1.3000×10$^{-5}$, $A_6$=−3.8100×10$^{-9}$, $A_8$=5.0500×10$^{-11}$, $A_{10}$=0

In the present embodiment, Conditional Expression (1) to Conditional Expression (7) are satisfied, as indicated below.

$$a_{det}/b=0.431875 \tag{1}$$

$$a_{att}/b=1 \tag{2}$$

$$a_{stop}/b=0.194 \tag{3}$$

$|d/F_b|=1.000377065$ (4)

$|f_{CD}/f_{COL}|=3.0.9907701$ (5)

$(f_{CD}+f_{COL})/L=0.40094542$ (6)

$WD_{det}/WD_{att}=3.152777778$ (7)

Figure 5A:
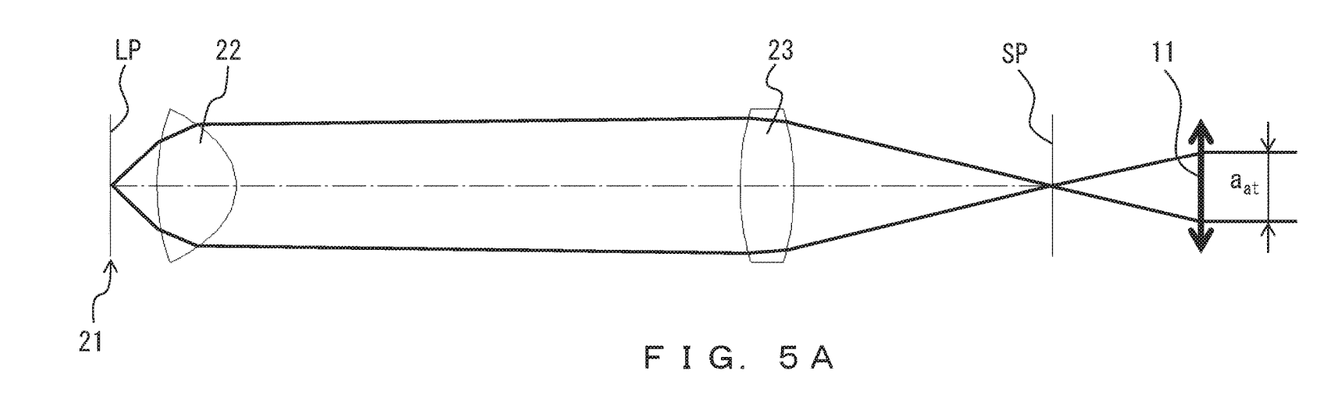
FIG. 5A illustrates the beams of light in a state in which a condenser lens 23 is mounted.
Figure 5B:
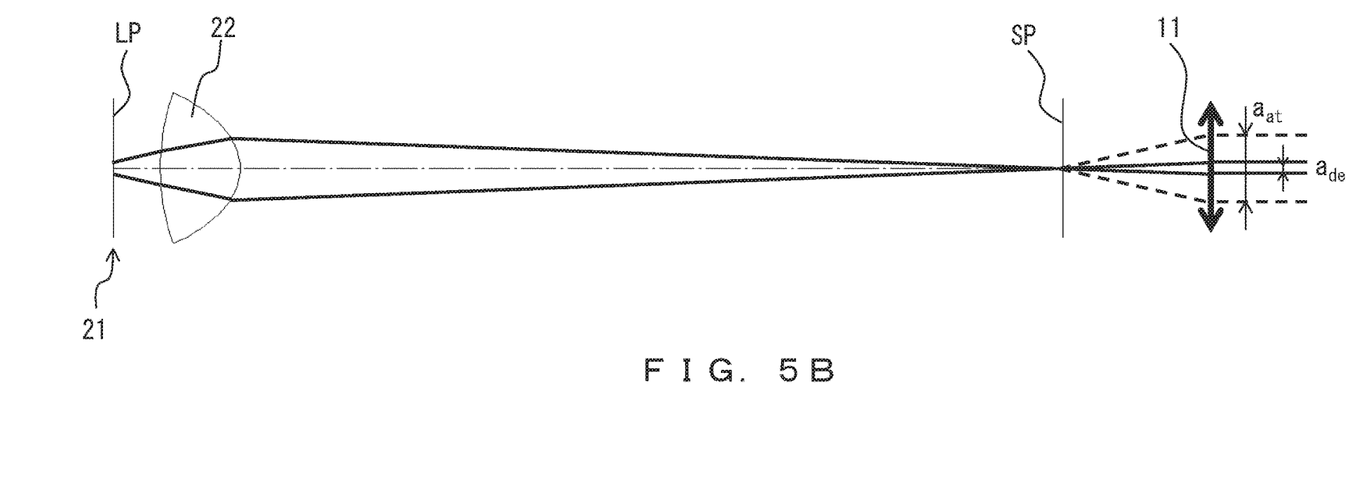
FIG. 5B illustrates the beams of light in a state in which the condenser lens 23 has been removed.

FIGS. 5A and 5B illustrate beams of light from the LED light source 21 to the objective 11. FIG. 5A illustrates the beams of light in a state in which the condenser lens 23 is mounted. FIG. 5B illustrates the beams of light in a state in which the condenser lens 23 has been removed. The beams of light represented by solid lines in FIGS. 5A and 5B are beams of light that enter the sample plane SP at one point on the optical axis at a maximum angle of incidence. In other words, FIGS. 5A and 5B illustrate the beams of light that are tracked from the sample plane SP to the light source.

As illustrated in FIG. 5A, in a state in which the condenser lens 23 is inserted into the light path, the illumination optical system 20 is a critical illumination optical system that collects light emitted from one point of the light-emitting surface LP at one point of the sample plane SP. In this case, it is possible to illuminate the sample plane SP with a numerical aperture having the same value as the designed value of the illumination optical system. This permits a realization of a high pupil filling rate.

On the other hand, as illustrated in FIG. 5B, in a state in which the condenser lens 23 has been removed, the illumination optical system 20 is not a critical illumination optical system, so the beams of light that are tracked from one point of the sample plane SP are not collected at one point of the light-emitting surface LP. Thus, the maximum angle of incidence on the sample plane SP varies greatly according to the size and the position of a light source (the LED light source 21). For example, if the size of a light source is larger, the maximum angle of incidence is larger and the pupil filling rate tends to also be increased. In the microscope, the size and the position of the LED light source 21 are designed such that Condition Expression (1) is satisfied.

<Second Embodiment>

A microscope according to the present embodiment is different from the microscope according to the first embodiment in that it includes a second objective instead of the objective 11. It is similar to the microscope according to the first embodiment in that it includes the illumination optical system 20 of FIG. 4.

The second objective that is used in combination with the illumination optical system 20 is an ideal lens, and the following are its focal length f, numerical aperture NA, and pupil diameter b. The second objective is a 40× objective that is used in combination with a tube lens with a focal length of 180 mm.

f=4.5 mm, NA=0.6, b=5.4 mm

The following are parameters when the second objective is combined with the illumination optical system 20. $a_{stop}$ is calculated in a state in which the diameter of the aperture stop 7a provided in the surface of the collector lens 22 facing a sample side (surface number s3) is set to 5 mm.

$a_{det}$=0.35019 mm, $a_{att}$=2.13111 mm, $a_{stop}$=0.27936 mm

In the present embodiment, Conditional Expression (1) to Conditional Expression (7) are satisfied, as indicated below.

$a_{det}/b=0.06485$ (1)

$a_{att}/b=0.39465$ (2)

$a_{stop}/b=0.051733333333333$ (3)

$|d/Fb|=1.000377065$ (4)

$|f_{CD}/f_{COL}|=3.039907701$ (5)

$(f_{CD}+f_{COL})/L=0.40094542$ (6)

$WD_{det}/WD_{att}=3.152777778$ (7)

<Third Embodiment>

Figure 6A:
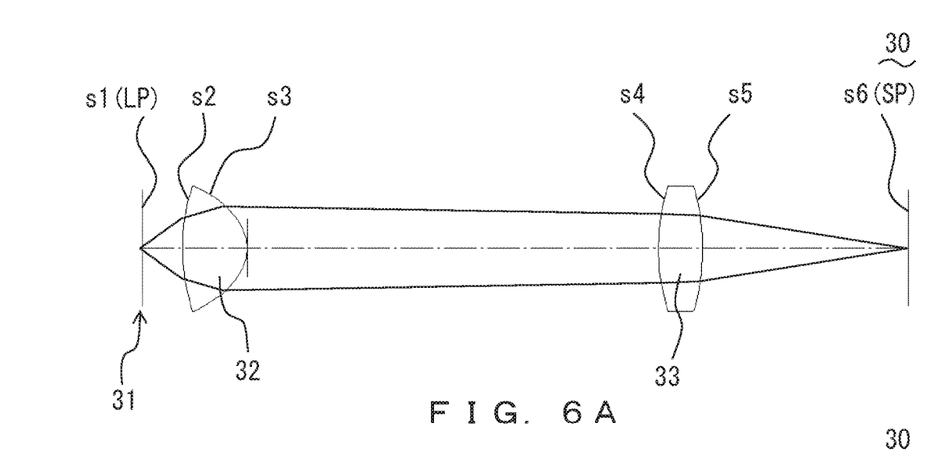
FIG. 6A illustrates the beams of light in a state in which a condenser lens 33 is mounted.
Figure 6B:
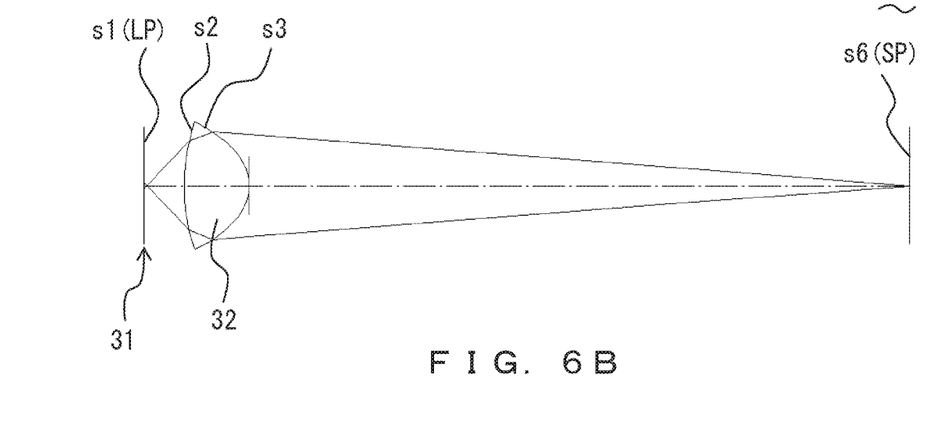
FIG. 6B illustrates the beams of light in a state in which the condenser lens 33 has been removed.

FIGS. 6A and 6B illustrate beams of light from an LED light source 31 to the sample plane SP in an illumination optical system 30 according to the present embodiment. FIG. 6A illustrates the beams of light in a state in which a condenser lens 33 is mounted. FIG. 6B illustrates the beams of light in a state in which the condenser lens 33 has been removed. The beams of light represented by solid lines in FIGS. 6A and 6B are beams of light that enter the sample plane SP at one point on the optical axis at a maximum angle of incidence. In other words, FIGS. 6A and 6B illustrate the beams of light that are tracked from the sample plane SP to the light source.

A microscope according to the present embodiment is different from the microscope according to the first embodiment in that it includes the illumination optical system 30 of FIGS. 6A and 6B. It is similar to the microscope according to the first embodiment in regard to the other points. The illumination optical system 30 includes an LED light source 31, a collector lens 32, and a condenser lens 33. The LED light source 31 is a surface-emitting light source, and has, for example, a light-emitting surface LP with a φ (a diameter) of 2 mm. The collector lens 32 is a single lens that has a positive power, and an aspherical lens that has an aspherical surface facing a sample side. The condenser lens 33 is a single lens that has a positive power, and is a biconvex lens.

When the illumination optical system 30 is compared with the illumination optical system 20, the LED light source 31 and the collector lens 32 of the illumination optical system 30 are similar to the LED light source 21 and the collector lens 22 of the illumination optical system 20. However, the illumination optical system 30 is configured such that the distance between the LED light source 31 and the collector lens 32 is longer than the distance between the LED light source 21 and the collector lens 22. In other words, the LED light source 31 is arranged further away from a front focal position of the collector lens 32. Thus, light emitted from the LED light source 31 is more strongly converged in the collector lens 32, compared to the case of the illumination optical system 20. A working distance (WD) can be made longer if a power of the condenser lens 33 is designed to be weaker, but a numerical aperture (NA) of light that illuminates the sample plane SP is smaller if the power is made weaker. In the illumination optical system 30, the working distance and the numerical aperture are balanced by designing the power of the condenser lens 33 properly.

The following are pieces of data of the illumination optical system 30.

Fb=12.9951 mm, d=13.8 mm, $f_{CD}$=74.2696 mm, $f_{COL}$=26.0025 mm, L=260.8 mm, $WD_{det}$=225 mm, $WD_{att}$=70 mm The objective 11 that is used in combination with the illumination optical system 30 is an ideal lens, and is a 4× objective similar to that of the first embodiment. The following are parameters when the objective 11 is combined with the illumination optical system 30. $a_{stop}$ is calculated in a state in which the diameter of the aperture stop 7a provided in the surface of the collector lens 32 facing a sample side (surface number s3) is set to 5 mm.

$a_{det}$=6.8877 mm, $a_{att}$=14.4 mm, $a_{stop}$=3.0708 mm

The following is lens data of the illumination optical system 30. INF in the lens data represents infinity (∞). Aspherical surface data of the collector lens 32 is similar to the aspherical surface data of the collector lens 22 in the illumination optical system 20.
Illumination Optical System 30

| s | r | d | nd | vd |
|---|---|---|---|---|
| 1 | INF | 13.8000 | | |
| 2 | 68.2150 | 22.0000 | 1.52287 | 59.89 |
| 3* | −15.1000 | 140.0000 | | |
| 4 | 75.0000 | 15.0000 | 1.52287 | 59.89 |
| 5 | −75.0000 | 70.0000 | | |
| 6 | INF | | | |

In the present embodiment, Conditional Expression (1) to Conditional Expression (7) are satisfied, as indicated below.

$$a_{det}/b=0.4783125 \quad (1)$$

$$a_{att}/b=1 \quad (2)$$

$$a_{stop}/b=0.21325 \quad (3)$$

$$|d/F_b|=1.06193873075236 \quad (4)$$

$$|f_{CD}/f_{COL}|=2.856248437650226 \quad (5)$$

$$(f_{CD}+f_{COL})/L=0.384478911042945 \quad (6)$$

$$WD_{det}/WD_{att}=3.214285714285714 \quad (7)$$

<Fourth Embodiment>

A microscope according to the present embodiment is different from the microscope according to the third embodiment in that it includes a second objective instead of the objective 11. It is similar to the microscope according to the third embodiment in that it includes the illumination optical system 30 of FIGS. 6A and 6B.

The second objective that is used in combination with the illumination optical system 30 is an ideal lens, and is a 40× objective similar to that of the second embodiment. The following are parameters when the second objective is combined with the illumination optical system 30. $a_{stop}$ is calculated in a state in which the diameter of the aperture stop 7a provided in the surface of the collector lens 32 facing a sample side (surface number s3) is set to 5 mm.

$a_{det}=0.68877$ mm, $a_{att}=2.01825$ mm, $a_{stop}=0.30708$ mm

In the present embodiment, Conditional Expression (1) to Conditional Expression (7) are satisfied, as indicated below.

$$a_{det}/b=0.12755 \quad (1)$$

$$a_{att}/b=0.37375 \quad (2)$$

$$a_{stop}/b=0.056866666666667 \quad (3)$$

$$|d/F_b|=1.06193873075236 \quad (4)$$

$$|f_{CD}/f_{COL}|=2.856248437650226 \quad (5)$$

$$(f_{CD}+f_{COL})/L=0.384478911042945 \quad (6)$$

$$WD_{det}/WD_{att}=3.214285714285714 \quad (7)$$

<Fifth Embodiment>

Figure 7A:
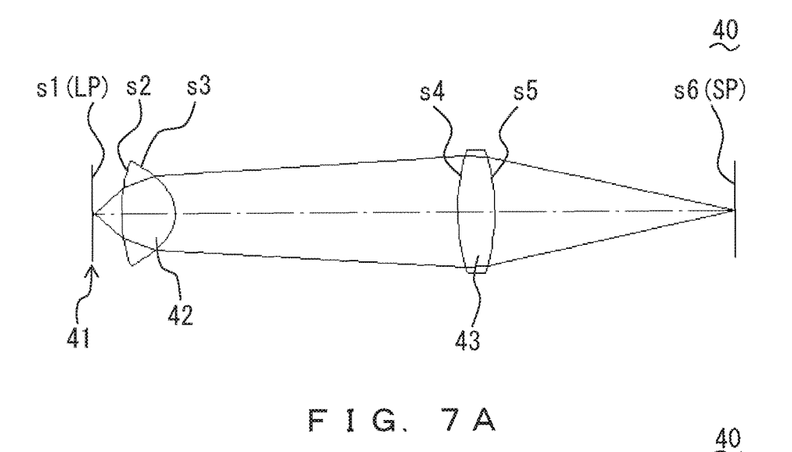
FIG. 7A illustrates the beams of light in a state in which a condenser lens 43 is mounted.
Figure 7B:
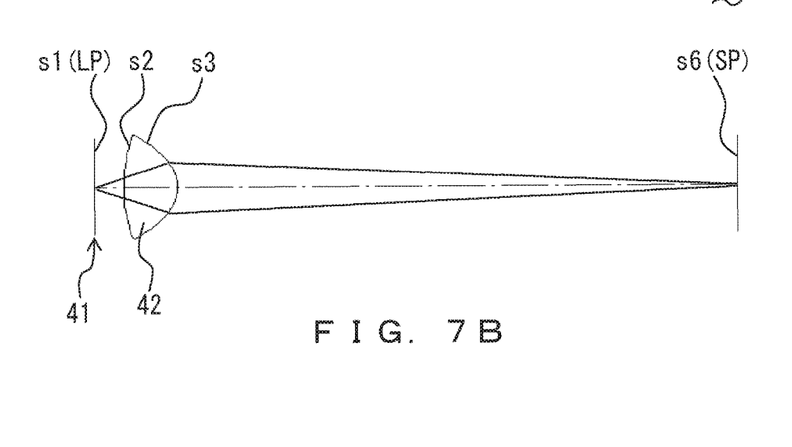
FIG. 7B illustrates the beams of light in a state in which the condenser lens 43 has been removed.

FIGS. 7A and 7B illustrate beams of light from an LED light source 41 to the sample plane SP in an illumination optical system 40 according to the present embodiment. FIG. 7A illustrates the beams of light in a state in which a condenser lens 43 is mounted. FIG. 7B illustrates the beams of light in a state in which the condenser lens 43 has been removed. The beams of light represented by solid lines in FIGS. 7A and 7B are beams of light that enter the sample plane SP at one point on the optical axis at a maximum angle of incidence. In other words, FIGS. 7A and 7B illustrate the beams of light that are tracked from the sample plane SP to the light source.

A microscope according to the present embodiment is different from the microscope according to the first embodiment in that it includes the illumination optical system 40 of FIGS. 7A and 7B. It is similar to the microscope according to the first embodiment in regard to the other points. The illumination optical system 40 includes an LED light source 41, a collector lens 42, and a condenser lens 43. The LED light source 41 is a surface-emitting light source, and has, for example, a light-emitting surface LP with a φ (diameter) of 2 mm. The collector lens 42 is a single lens that has a positive power, and an aspherical lens that has an aspherical surface facing a sample side. The condenser lens 43 is a single lens that has a positive power, and is a biconvex lens.

When the illumination optical system 40 is compared with the illumination optical system 20, the LED light source 41 and the collector lens 42 of the illumination optical system 40 are similar to the LED light source 21 and the collector lens 22 of the illumination optical system 20. However, the illumination optical system 40 is configured such that the distance between the LED light source 41 and the collector lens 42 is shorter than the distance between the LED light source 21 and the collector lens 22. In other words, the LED light source 41 is arranged closer to the collector lens 42 than a front focal position of the collector lens 42. Thus, light emitted from the LED light source 41 is refracted to a lesser extent in the collector lens 42, compared to the case of the illumination optical system 20, and the light directed to the sample plane SP becomes a divergent light. A lens diameter needed for the condenser lens 43 is larger if the condenser lens 43 is arranged further away from the collector lens 42. However, if the condenser lens 43 is made too close, it is not possible to secure a sufficient working distance when the condenser lens 43 has been removed. In the illumination optical system 40, the power and the position of the condenser lens 43 are designed in consideration of a balance between the size of the condenser lens 43 and the working distance.

The following are pieces of data of the illumination optical system 40.

$F_b$=12.9951 mm, d=12.1 mm, $f_{CD}$=88.5984 mm, $f_{COL}$=26.0025 mm, L=262.1 mm, $WD_{det}$=228 mm, $WD_{att}$=98 mm The objective 11 that is used in combination with the illumination optical system 40 is an ideal lens, and is a 4× objective similar to that of the first embodiment. The following are parameters when the objective 11 is combined with the illumination optical system 40. $a_{stop}$ is calculated in a state in which the diameter of the aperture stop 7a provided in the surface of the collector lens 42 facing a sample side (surface number s3) is set to 13 mm.

$a_{det}$=2.709 mm, $a_{att}$=14.4 mm, $a_{stop}$=7.1361 mm

The following is lens data of the illumination optical system 40. INF in the lens data represents infinity (∞). Aspherical surface data of the collector lens 42 is similar to the aspherical surface data of the collector lens 22 in the illumination optical system 20.

Illumination Optical System 40

| s | r | d | nd | vd |
|---|---|---|---|---|
| 1 | INF | 12.1000 | | |
| 2 | 68.2150 | 22.0000 | 1.52287 | 59.89 |
| 3* | −15.1000 | 115.0000 | | |
| 4 | 90.0000 | 15.0000 | 1.52287 | 59.89 |
| 5 | −90.0000 | 98.0000 | | |
| 6 | INF | | | |

In the present embodiment, Conditional Expression (1) to Conditional Expression (7) are satisfied, as indicated below.

$$a_{det}/b=0.188125 \quad (1)$$

$$a_{att}/b=1 \quad (2)$$

$$a_{stop}/b=0.4955625 \quad (3)$$

$$|d/F_b|=0.9311201915 \quad (4)$$

$$|f_{CD}/f_{COL}|=3.407303143928468 \quad (5)$$

$$(f_{CD}+f_{COL})/L=0.437241129339947 \quad (6)$$

$$WD_{det}/WD_{att}=2.326530612244898 \quad (7)$$

The embodiments described above are just examples to facilitate understanding of the present invention, and the embodiment of the present invention is not limited to these embodiments. Various modifications and alterations may be made to a microscope without departing from the scope of the invention specified in the claims.

What is claimed is:

1. A microscope comprising:
   a light source;
   a condenser lens that is arranged to be removable from and insertable in a light path of light from the light source and that radiates the light from the light source onto a sample;
   a collector lens that is arranged downstream of the light source along the light path, and is arranged between the light source and the condenser lens when the condenser lens is inserted in the light path; and
   an objective that collects the light from the light source, which has been transmitted through the sample,
   wherein a conditional expression $$1/20 \leq a_{det}/b \leq 1/2 \quad (1)$$

is satisfied, where b is an exit pupil diameter of the objective and $a_{det}$ is a diameter of an area which is included in an exit pupil plane of the objective and which is defined as the area through which the light from the light source, which has entered the objective through the sample, passes, in a state in which the condenser lens has been removed from the light path and light from the collector lens is directly radiated onto the sample.

2. The microscope according to claim 1, wherein a conditional expression $$1/3 \leq a_{att}/b \leq 1 \quad (2)$$

is satisfied, where $a_{att}$ is a diameter of an area which is included in the exit pupil plane of the objective and which is defined as the area through which the light from the light source, which has entered the objective through the sample, passes, in a state in which the condenser lens is inserted into the light path.

3. The microscope according to claim 1, further comprising an aperture stop arranged between the light source and the condenser lens,
   wherein a conditional expression $$1/20 \leq a_{stop}/b \leq 1/2 \quad (3)$$

is satisfied, where $a_{stop}$ is a diameter of an area which is included in the exit pupil plane of the objective and which is defined as the area through which the light from the light source that has entered the objective through the sample passes, in a state in which the condenser lens and the aperture stop are inserted into the light path.

4. The microscope according to claim 1, wherein a conditional expression $$0.9 \leq |d/F_b| \leq 1.1 \quad (4)$$

is satisfied, where $F_b$ is a distance to a front focal position of the collector lens from a first surface that is a closest surface of the collector lens to the light source and d is a distance from the first surface to a light-emitting surface of the light source.

5. The microscope according to claim 2, wherein a conditional expression $$0.9 \leq |d/F_b| \leq 1.1 \quad (4)$$

is satisfied, where $F_b$ is a distance to a front focal position of the collector lens from a first surface that is a closest surface of the collector lens to the light source and d is a distance from the first surface to a light-emitting surface of the light source.

6. The microscope according to claim 3, wherein a conditional expression $$0.9 \leq |d/F_b| \leq 1.1 \quad (4)$$

is satisfied, where $F_b$ is a distance to a front focal position of the collector lens from a first surface that is a closest surface of the collector lens to the light source and d is a distance from the first surface to a light-emitting surface of the light source.

7. The microscope according to claim 1, wherein a conditional expression $$2.5 \leq |f_{CD}/f_{COL}| \leq 7 \quad (5)$$

is satisfied, where $f_{COL}$ is a focal length of the collector lens and $f_{CD}$ is a focal length of the condenser lens.

8. The microscope according to claim 2, wherein a conditional expression $$2.5 \leq |f_{CD}/f_{COL}| \leq 7 \quad (5)$$

is satisfied, where $f_{COL}$ is a focal length of the collector lens and $f_{CD}$ is a focal length of the condenser lens.

9. The microscope according to claim 3, wherein a conditional expression $$2.5 \leq |f_{CD}/f_{COL}| \leq 7 \quad (5)$$

is satisfied, where $f_{COL}$ is a focal length of the collector lens and $f_{CD}$ is a focal length of the condenser lens.

10. The microscope according to claim 4, wherein a conditional expression $$2.5 \leq |f_{CD}/f_{COL}| \leq 7 \quad (5)$$

is satisfied, where $f_{COL}$ is a focal length of the collector lens and $f_{CD}$ is a focal length of the condenser lens.

11. The microscope according to claim 5, wherein a conditional expression $$2.5 \leq |f_{CD}/f_{COL}| \leq 7 \quad (5)$$

is satisfied, where $f_{COL}$ is a focal length of the collector lens and $f_{CD}$ is a focal length of the condenser lens.

12. The microscope according to claim 6, wherein a conditional expression $$2.5 \leq |f_{CD}/f_{COL}| \leq 7 \quad (5)$$

is satisfied, where $f_{COL}$ is a focal length of the collector lens and $f_{CD}$ is a focal length of the condenser lens.

13. The microscope according to claim 1, wherein conditional expressions $$1/8 \leq (f_{CD}+f_{COL})/L \leq 2/3 \quad (6)$$

$$1/5 \leq WD_{det}/WD_{att} \leq 4 \quad (7)$$

are satisfied, where $f_{COL}$ is a focal length of the collector lens, $f_{CD}$ is a focal length of the condenser lens, L is a distance from a light-emitting surface of the light source to a sample plane, $WD_{det}$ is a distance to the sample plane from a closest surface of the collector lens to the sample plane, and $WD_{att}$ is a distance, in a state in which the condenser lens is inserted into the light path, to the sample plane from a closest surface of the condenser lens to the sample plane.

14. The microscope according to claim 2, wherein conditional expressions $$1/8 \leq (f_{CD}+f_{COL})/L \leq 2/3 \quad (6)$$

$$1/5 \leq WD_{det}/WD_{att} \leq 4 \quad (7)$$

are satisfied, where $f_{COL}$ is a focal length of the collector lens, $f_{CD}$ is a focal length of the condenser lens, L is a distance from a light-emitting surface of the light source to a sample plane, $WD_{det}$ is a distance to the sample plane from a closest surface of the collector lens to the sample plane, and $WD_{att}$ is a distance, in a state in which the condenser lens is inserted into the light path, to the sample plane from a closest surface of the condenser lens to the sample plane.

15. The microscope according to claim 3, wherein conditional expressions $$1/8 \leq (f_{CD}+f_{COL})/L \leq 2/3 \quad (6)$$

$$1/5 \leq WD_{det}/WD_{att} \leq 4 \quad (7)$$

are satisfied, where $f_{COL}$ is a focal length of the collector lens, $f_{CD}$ is a focal length of the condenser lens, L is a distance from a light-emitting surface of the light source to a sample plane, $WD_{det}$ is a distance to the sample plane from a closest surface of the collector lens to the sample plane, and $WD_{att}$ is a distance, in a state in which the condenser lens is inserted into the light path, to the sample plane from a closest surface of the condenser lens to the sample plane.

16. The microscope according to claim 4, wherein conditional expressions $$1/8 \leq (f_{CD}+f_{COL})/L \leq 2/3 \quad (6)$$

$$1/5 \leq WD_{det}/WD_{att} \leq 4 \quad (7)$$

are satisfied, where $f_{COL}$ is a focal length of the collector lens, $f_{CD}$ is a focal length of the condenser lens, L is a distance from a light-emitting surface of the light source to a sample plane, $WD_{det}$ is a distance to the sample plane from a closest surface of the collector lens to the sample plane, and $WD_{att}$ is a distance, in a state in which the condenser lens is inserted into the light path, to the sample plane from a closest surface of the condenser lens to the sample plane.

17. The microscope according to claim 5, wherein conditional expressions $$1/8 \leq (f_{CD}+f_{COL})/L \leq 2/3 \quad (6)$$

$$1/5 \leq WD_{det}/WD_{att} \leq 4 \quad (7)$$

are satisfied, where $f_{COL}$ is a focal length of the collector lens, $f_{CD}$ is a focal length of the condenser lens, L is a distance from a light-emitting surface of the light source to a sample plane, $WD_{det}$ is a distance to the sample plane from a closest surface of the collector lens to the sample plane, and $WD_{att}$ is a distance, in a state in which the condenser lens is inserted into the light path, to the sample plane from a closest surface of the condenser lens to the sample plane.

18. The microscope according to claim 6, wherein conditional expressions $$1/8 \leq (f_{CD}+f_{COL})/L \leq 2/3 \quad (6)$$

$$1/5 \leq WD_{det}/WD_{att} \leq 4 \quad (7)$$

are satisfied, where $f_{COL}$ is a focal length of the collector lens, $f_{CD}$ is a focal length of the condenser lens, L is a distance from a light-emitting surface of the light source to a sample plane, $WD_{det}$ is a distance to the sample plane from a closest surface of the collector lens to the sample plane, and $WD_{att}$ is a distance, in a state in which the condenser lens is inserted into the light path, to the sample plane from a closest surface of the condenser lens to the sample plane.

19. The microscope according to claim 11, wherein conditional expressions $$1/8 \leq (f_{CD}+f_{COL})/L \leq 2/3 \quad (6)$$

$$1/5 \leq WD_{det}/WD_{att} \leq 4 \quad (7)$$

are satisfied, where $f_{COL}$ is a focal length of the collector lens, $f_{CD}$ is a focal length of the condenser lens, L is a distance from a light-emitting surface of the light source to a sample plane, $WD_{det}$ is a distance to the sample plane from a closest surface of the collector lens to the sample plane, and $WD_{att}$ is a distance, in a state in which the condenser lens is inserted into the light path, to the sample plane from a closest surface of the condenser lens to the sample plane.

20. The microscope according to claim 12, wherein conditional expressions $$1/8 \leq (f_{CD}+f_{COL})/L \leq 2/3 \quad (6)$$

$$1/5 \leq WD_{det}/WD_{att} \leq 4 \quad (7)$$

are satisfied, where $f_{COL}$ is a focal length of the collector lens, $f_{CD}$ is a focal length of the condenser lens, L is a distance from a light-emitting surface of the light source to a sample plane, $WD_{det}$ is a distance to the sample plane from a closest surface of the collector lens to the sample plane, and $WD_{att}$ is a distance, in a state in which the condenser lens is inserted into the light path, to the sample plane from a closest surface of the condenser lens to the sample plane.

* * * * *